United States Patent
Blandy

(10) Patent No.: US 6,983,361 B1
(45) Date of Patent: Jan. 3, 2006

(54) APPARATUS AND METHOD FOR IMPLEMENTING SWITCH INSTRUCTIONS IN AN IA64 ARCHITECTURE

(75) Inventor: Geoffrey Owen Blandy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 964 days.

(21) Appl. No.: 09/671,973

(22) Filed: Sep. 28, 2000

(51) Int. Cl.
*G06F 9/00* (2006.01)

(52) U.S. Cl. ...................... 712/236; 712/229
(58) Field of Classification Search ............... 712/229, 712/236
See application file for complete search history.

(56) References Cited

U.S. PATENT DOCUMENTS 6,286,135 B1 * 9/2001 Santhanam .............. 717/146
6,412,105 B1 * 6/2002 Maslennikov et al. ...... 717/151
6,571,385 B1 * 5/2003 Muthukumar et al. ...... 717/150

OTHER PUBLICATIONS

"The Java Virtual Machine Specification" Sun Microsystems, Inc., copyright 1997, http://java.sun.com/docs/books/vmspec/html/Instructions2.doc14.html.*
Sinclaim et al, "ASIC Design for Conditional Nested Loops with Predicate Registers", Aug. 11, 1999, Circuits and Systems, 1999. 42nd Midwest Symposium on, vol. 2, pp. 874–877.*

* cited by examiner

*Primary Examiner*—Eddie Chan
*Assistant Examiner*—Charles Harkness
(74) *Attorney, Agent, or Firm*—Duke W. Yee; Volel Emile; Stephen J. Walder, Jr.

(57) ABSTRACT

An apparatus and method for implementing a switch instruction in the IA64 architecture is provided. With the apparatus and method, a first register is used to identify whether a low is either 0, 1 or some other value, and a second register is used to identify a shift amount. The first register is then shifted by the shift amount in the second register. The first register value is then moved to the predicate register set in the IA64 architecture, thereby identifying which branch is to be taken. If the first register is shifted outside the predicate registers, a default address is provided.

26 Claims, 2 Drawing Sheets

APPARATUS AND METHOD FOR IMPLEMENTING SWITCH INSTRUCTIONS IN AN IA64 ARCHITECTURE

RELATED APPLICATIONS

The present invention is related to commonly assigned and co-pending U.S. patent application 09/671,876 entitled "APPARATUS AND METHODS FOR IMPROVED DEVIRTUALIZATION OF METHOD CALLS", 09/671,770 entitled "APPARATUS AND METHOD FOR AVOIDING DEADLOCKS IN A MULTITHREADED ENVIRONMENT", 09/671,877 entitled "APPARATUS AND METHOD FOR DETECTING AND HANDLING EXCEPTIONS", 09/671,771 entitled "APPARATUS AND METHOD FOR VIRTUAL REGISTER MANAGEMENT USING PARTIAL DATA FLOW ANALYSIS FOR JUST-IN-TIME COMPILATION", 09/671,873 entitled "APPARATUS AND METHOD FOR AN ENHANCED INTEGER DIVIDE IN AN IA64 ARCHITECTURE", 09/671,874 entitled "APPARATUS AND METHOD FOR CREATING INSTRUCTION GROUPS FOR EXPLICITLY PARALLEL ARCHITECTURES", and 09/671,875 entitled "APPARATUS AND METHOD FOR CREATING INSTRUCTION BUNDLES IN AN EXPLICITLY PARALLEL ARCHITECTURE", filed on even data herewith and hereby incorporated by reference.

BACKGROUND OF THE INVENTION

1. Technical Field

The present invention is directed to an apparatus and method for implementing switch instructions in an IA64 architecture.

2. Description of Related Art

Dense switch instructions, such as tableswitch in Java bytecode, provide for multi-way branching based on an input integer and a range of integer values. Known systems implement such switching instructions in one of two ways. First, multiple compare/branch pairs may be utilized followed by a branch to a default address. Alternatively, a check to see if an input index value falls within a specified range may be made with a target address being selected from an array of such addresses if the index does fall within the range. If the index does not fall within the range, a default address is provided. The address is then loaded in a branch register and an execution branch to that address is performed.

Both approaches set forth above require multiple comparisons which take up processing cycles that may otherwise be used for other useful work. Thus, it would be advantageous to have an apparatus and method for implementing a switch instruction which reduces the number of comparisons required to perform the switch instruction. It would further be beneficial to have an apparatus and method to perform such switching instructions in an IA64 architecture based data processing device.

SUMMARY OF THE INVENTION

The present invention provides an apparatus and method for implementing a dense switch instruction in the IA64 architecture. With the present invention, a first register is loaded with a value equal to a power of 2 (a single bit), and a second register is used to develop a shift amount based on the index (comparand) value of the switch. The first register is then shifted by the shift amount in the second register and the result is loaded into a contiguous range of IA64 predicate registers with the result being that at most 1 of the predicate registers will receive the value 1 while all others will receive the value 0. The loading of the predicates is followed by a series of predicated branch instructions such that thee will be one branch for each of the targets designated by the switch instruction. The qualifying predicates used to gate these branches are the same as those that were loaded in the previous step. The series of predicated branches is followed by an unpredicated branch to the default target address.

BRIEF DESCRIPTION THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides an apparatus and method for implementing switch instructions in an IA64 architecture data processing device. The IA64 architecture data processing device may be a stand-alone device, a client device, a server device, or the like, and may be a part of a distributed network. Thus, the following figures are provided as a description of some of the possible data processing system in which the present invention may be implemented.

Figure 1:
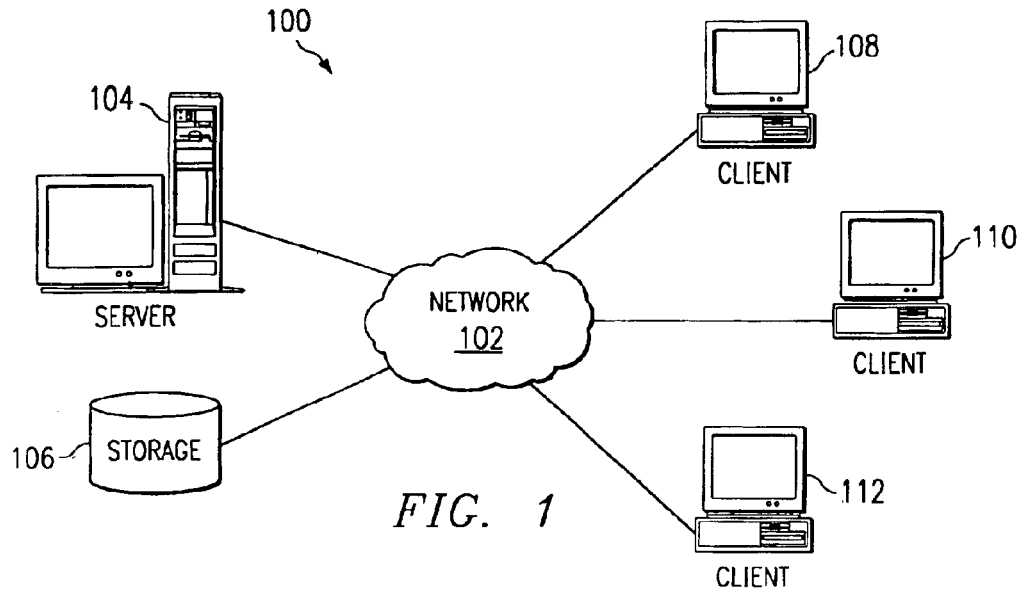
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with the storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
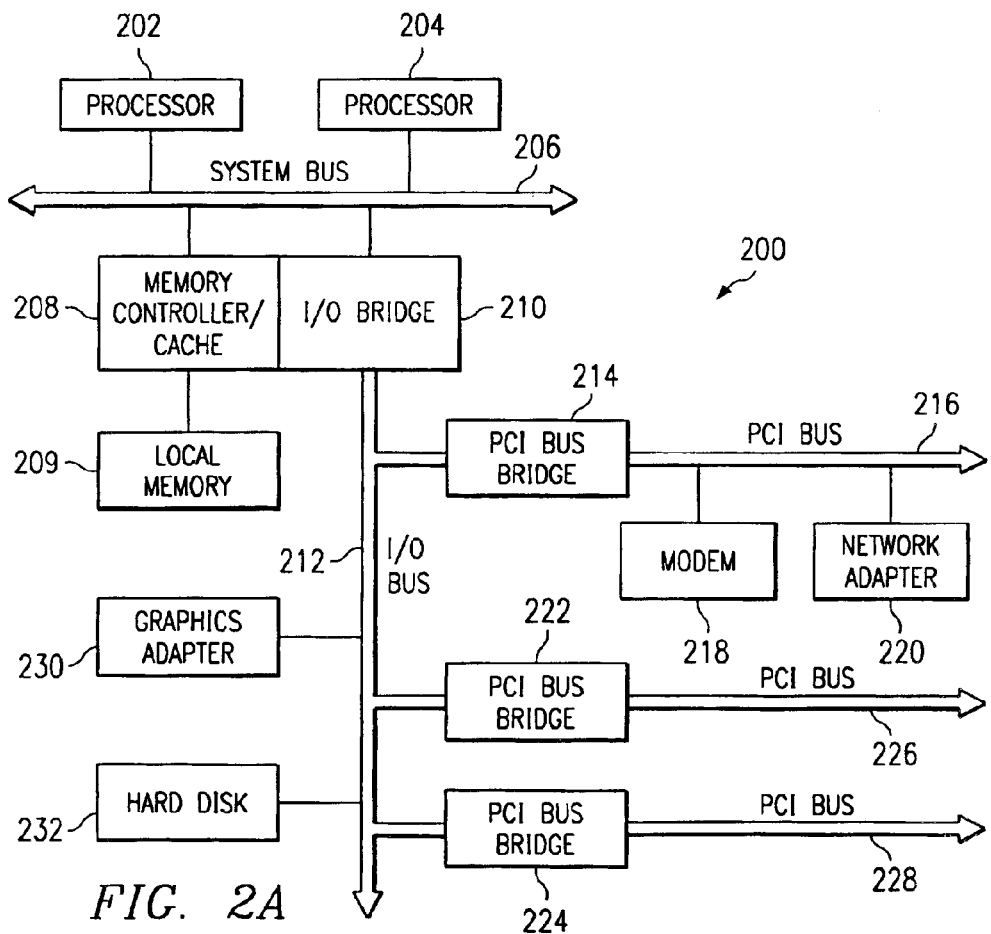
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapted 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
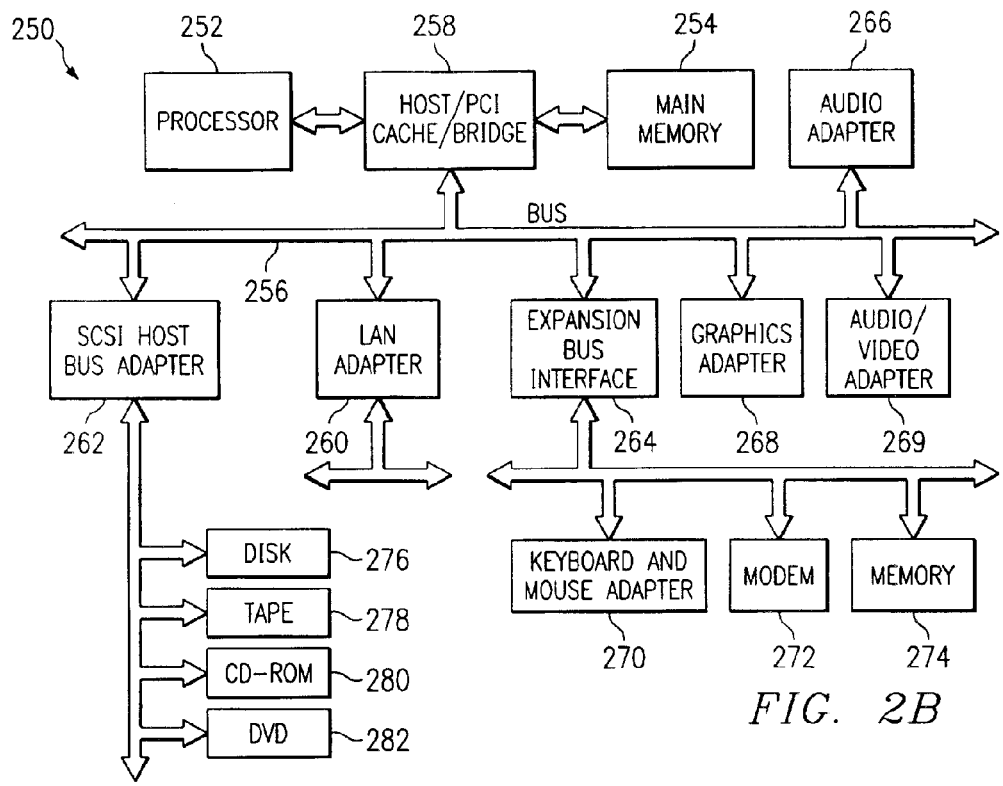
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three for four PCI expansion slots or add-in connectors.

An operating system runs on processor 252 and is used to coordinate and provide control of various components within data processing system 250 in FIG. 2B. The operating system may be a commercially available operating system such as OS/2, which is available from International Business Machines Corporation.

An object oriented programming system such as Java may run in conjunction with the operating system and may provide calls to the operating system from Java programs or applications executing on data processing system 250. Instructions for the operating system, the object oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for implementing switch instructions in an IA64 architecture. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was complied. Java programs are complied for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

The present invention is equally applicable to either a platform specific environment, i.e. a traditional computer application environment loading modules or native methods, or a platform independent environment, such as an interpretive environment, e.g., a Java environment loading classes, methods and the like. The only limitation on the data processing system and operating environment of the present invention is that the architecture be an IA64 architecture. The preferred embodiment of the present invention will be described in terms of an IA64 architecture operating in Java and having a Java virtual machine (JVM).

The IA64 architecture is described in the "Intel IA-64 Architecture Software Developer's Manual" available for download from http://developer.intel.com/desgin/Ia-64/downloads/24531702s.htm, which is hereby incorporated by reference. Briefly, IA64 allows a compiler or programmer to explicitly group instructions to be executed concurrently. The IA64 architecture provides a set of 64 single bit predicate registers which can be used to control instruction execution. A predicate register can be associated with an instruction as a "qualifying predicate." When the qualifying predicate is true, the instruction executes normally. When the qualifying predicate is false, the instruction will not modify the architectural state, thereby acting essentially as a NOP instruction.

The present invention provides a mechanism by which switch instructions may be implemented in the IA64 architecture. The present invention will be described with reference to the JAVA bytecode tableswitch. However, other types of switch instructions, such as dense or semi-dense switch statements in C, may be implemented using the mechanism of the present invention.

The JAVA bytecode tablesswitch provides a default target address, a low value, a high value, and an array of target addresses. The bytecode tableswitch takes an integer index as an input parameter and logically functions as follows:

1) If the index is less than the low value or higher than the high value, a branch is made to the default target address; and 2) Otherwise, the low value is substracted from the index and the result is used to index into the array of target addresses and a branch is made to the selected target.

The present invention exploits the IA64 architecture's provision of predicate registers and parallel instruction execution to efficiently implement a switch instruction, such as a Java tableswitch instruction. The use of the present invention to perform the switch instruction is limited to instances where the number of branch targets, excluding default, is less than or equal to number of usable predicate registers provided in the IA64 architecture.

As mentioned above, the current IA64 architecture provides a set of 64 single bit predicate registers which can be used to control instruction execution. Thus, the present invention is limited to instances where the number of branch targets is less than or equal to 63, i.e. there are 63 of the 64 predicate registers available with the first predicate register, p0, being a read-only register that always returns 1.

The invention uses a contiguous range of predicate registers starting with any predicate register other than p0. The number of predicate registers in the range will be (high-low +1). Note that for switches where (high-low +1) is 10 or fewer, it may be advantageous to select a range that includes only the scratch predicates p6 through p15 (defined by software convention and described in Intel's "IA-64 Software Conventions and Runtime Architecture Guide"). In this way the predicate registers need not be preserved and restored.

The following processes are performed using the present invention.

1) a range of predicate registers is selected such that there are as many predicate registers in the range as there are entries in the target address array. For example if we have 10 targets in our target address array we may chose predicates p6 through p15.

2) if the low value is less than the lowest predicate selected (lowpredicate), a register regA is set to 2 (lowpredicate-low value) and another register, regB, is set to the index (if the index is already in a register, that register will be used instead of regB); otherwise, regA is set to 2lowpredicate and regB is set to index—low value.

3) regA is then shifted to the left by the value of regB, and regA is moved to the predicate register set using the IA64 instruction:

mov pr=regA, mask where mask identifies a contiguous range of (high-low+1) predicate registers starting with lowpredicate. Only the specified range is loaded into the predicate register set with the other predicate registers being unaffected.

A number of predicated branches (high-low +1) follow. The first branch has the first target address from the target address array as its destination and is qualified by lowpredicate. Each successive branch uses the next target address array entry and is qualified by the next higher predicate. A final unpredicated branch follows which branches to the default address.

The shifting of regA by a value (index-low) stored in regB is a mechanism by which the particular branch that is to be executed is identified. As mentioned above, instruction branches identified by a predicate register are only executed if the predicate register value is 1. Thus, by shifting the regA value by the regB value, a particular predicate register, associated with the instruction branch to be executed, is identified.

Note that with the above mechanism, only one of the branches will actually be taken. Further, if the index is out of the range (i.e. The index is lower than low value or higher than high value), the single bit loaded into regA will be shifted out of the bit range (or will not be shifted into the bit range for example when low is 1 and index is 0) that is moved to the predicate registers thereby resulting in only the default branch being taken.

Thus, the present invention provides a mechanism by which a switching instruction may be implemented in the IA64 architecture. The particular mechanism provided eliminates the need to check for out of range values, as is required in the conventional switching instruction implementations, such as Java tableswitch bytecode. Furthermore, theoretically all of the branches can be executed in parallel on an IA64 processor yielding extremely low latency.

Figure 3:
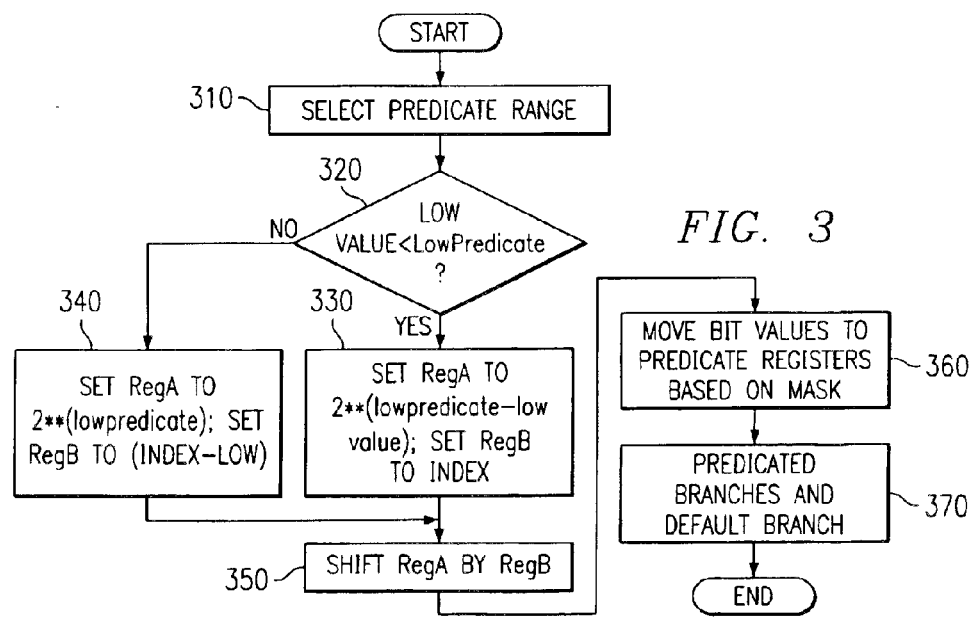
FIG. 3 is a flowchart outlining an exemplary operation of the present invention.

FIG. 3 is a flowchart outlining an exemplary operation of the present invention. As shown in FIG. 3, the operation starts with the selection of a predicate range (lowpredicate-highpredicate) such that the number of predicates in the range is equal to the number of entries in the target address array (step 310). A determination is made as to whether the low value is lower than lowpredicate (step 320). If so, the value in regA is set to 2(lowpredicate-low value) and regB is set to index (step 330; otherwise, the value in regA is set to 2lowpredicate and regB is set to index—low value (step 340). RegA is then shifted to the left by the value of regB (step 350) and a range of bits from regA is moved to the corresponding predicate registers (step 360). A set of (high-low +1) predicated branches follow with a non-predicated branch to the default target following the predicated branches (step 370). The operation then ends.

the present invention provides a mechanism by which the predicate registers available in the IA64 architecture may be used to perform switching instructions. By using the predicate registers in the manner described above, the number of instructions that must be performed is reduced, thereby increasing the efficiency of the system. The number of instructions is reduced by eliminating the need to perform boundary checks on the high and low values for the switch instruction. Also if the lowest predicate in the selected range is greater than low value the step of subtracting low value from index can be avoided.

As mentioned above, the present invention may be used to implement a semi-dense switch statement. In order to implement a semi-dense switch statement with the current invention merely fill in the "missing" entries in the branch target array with the default address and treat it as a dense switch statement.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of implementing a switch instruction in an IA64 architecture based data processing device, comprising:
    receiving a call to the switch instruction, the call including one or more parameters for the switch instruction, wherein the one or more parameters includes a range of branch address, the range being defined by a high value and a low value;
    loading a plurality of predicate registers with values associated with a plurality of branch addresses based on the one or more parameters;
    calling an instruction associated with one of the plurality of branch addresses based on the values of the plurality of predicate registers;
    determining if the low value is lower than a lowpredicate;
    setting a first register value to 2**(lowpredicate-low value) if the low value is lower than the lowpredicate; and
    setting the first register value to 2**(lowpredicate) if the low value is not zero, where lowpredicate is a predicate register number of a lowest numbered predicate register.

2. The method of claim 1, wherein the one or more parameters includes an index into the range of branch addresses, the method further comprising:
    setting a second register value equal to the index if the low value is lower than the lowpredicate; and
    setting the second register value equal to a different between the index and the low value if the low value is not lower than the lowpredicate.

3. The method of claim 2, further comprising shifting the first register value to the left by the second register value.

4. The method of claim 3, further comprising moving the first register value to the plurality of predicate registers.

5. The method of claim 4, wherein moving the first register value to the plurality of predicate registers is performed using a mask identifying predicate registers to be loaded.

6. The method of claim 1, wherein the switch instruction is a Java tableswitch instruction.

7. The method of claim 1, wherein the method is implemented in a Java Virtual Machine.

8. The method of claim 1, wherein the switch instruction is a dense switch statement in C.

9. The method of claim 3, wherein the one or more parameters includes a default address, and wherein if the first register value is shifted outside of a range of the plurality of predicate registers, an instruction associated with the default address is called.

10. An apparatus for executing a switch instruction in an IA64 architecture based data processing device, comprising:
    means for receiving a call to the switch instruction, the call including one one or more parameters for the switch instruction, wherein the one or more parameters includes a range of branch address, the range being defined by a high value and low value;
    means for loading a plurality of predicate registers with values associated with a plurality of branch addresses based on the one or more parameters;
    means for calling an instruction associated with one of the plurality of branch addresses based on the values of the plurality of predicate registers;
    means for determining if the low value is lower than a lowpredicate;
    means for setting a first register value to 2** (lowpredicate-low value) if the low value is lower than the lowpredicate; and
    means for setting the first register value to 2** (lowpredicate) if the low value is not lower than the lowpredicate, where lowpredicate is a predicate register number of a lowest numbered predicate register.

11. The apparatus of claim 10, wherein the one or more parameters includes an index into the range of branch addresses, the apparatus further comprising:
    means for setting a second register value equal to the index if the low value is lower than the lowpredicate; and
    means for setting the second register value equal to a difference between the index and the low value if the low value is not lower than the lowpredicate.

12. The apparatus of claim 11, further comprising means for shifting the first register value to the left by the second register value.

13. The apparatus of claim 12, further comprising means for moving the first register value to the plurality of predicate registers.

14. The apparatus of claim 13, wherein the means for moving the first register value to the plurality of predicate registers uses a mask to identify predicate registers to be loaded.

15. The apparatus of claim 10, wherein the switch instruction is a Java tableswitch instruction.

16. The apparatus of claim 10, wherein the switch instruction is a dense switch statement in C.

17. The apparatus of claim 12, wherein the one or more parameters includes a default address, and wherein if the first register value is shifted outside of a range of the plurality of predicate registers, an instruction associated with the default address is called.

18. A computer program product in a computer readable medium for executing a switch instruction in an IA64 architecture based data processing device, comprising:

first instructions for receiving a call to the switch instruction, the call including one or more parameters for the switch instruction, wherein the one or more parameters includes a range of branch address, the range being defined by a high value and a low value;

second instructions for loading a plurality of predicate registers with values associated with a plurality of branch addresses based on the one or more parameters;

third instructions for calling an instruction associated with one of the plurality of branch addresses based on the values of plurality of predicate registers;

fourth instructions for determining if the low value is lower than a lowpredicate;

fifth instructions for acting a first register value to 2 (lowpredicate-low value) if the low value is lower than the lowpredicate; and sixth instructions for setting the first register value to 2(lowpredicate) if the low value is not lower than the lowpredicate, where lowpredicate is a predicate register number of a lowest numbered predicate register.

19. The computer program product of claim 18, wherein the one or more parameters includes an index into the range of branch addresses, the computer program product further comprising:

seventh instructions for setting a second register value equal to the index if the low value is lower than the lowpredicate; and Eighth instructions for setting the second register value equal to a difference between the index, and the low value if the low value is not lower than the lowpredicate.

20. The computer program product of claim 19, further comprising ninth instructions for shifting the first register value to the left by the second register value.

21. The computer program product of claim 20, further comprising tenth instructions for moving the first register value to the plurality of predicate registers.

22. The computer program product of claim 21, wherein the tenth instructions for moving the first register value to the plurality of predicate registers are executed using a mask identifying predicate registers to be loaded.

23. The computer program product of claim 18, wherein the switch instruction is a Java tableswitch instruction.

24. The computer program product of claim 18, wherein the computer program product is executed in a Java Virtual Machine.

25. The computer program product of claim 18, wherein the switch instruction is a dense switch statement in C.

26. The computer program product of claim 20, wherein the one or more parameters includes a default address, and wherein if the first register value is shifted outside of a range of the plurality of predicate registers, an instruction associated with the default address is called.

* * * * *

UNITED STATES PATENT AND TRADEMARK OFFICE
CERTIFICATE OF CORRECTION

PATENT NO. : 6,983,361 B1
APPLICATION NO. : 09/671973
DATED : January 3, 2006
INVENTOR(S) : Blandy It is certified that error appears in the above-identified patent and that said Letters Patent is hereby corrected as shown below:

Col. 7, line 12: before "present" delete "the" and insert --The--.

Col. 9, line 34: after "for" delete "acting" and insert --setting--.

Signed and Sealed this

Twenty-third Day of January, 2007

JON W. DUDAS
*Director of the United States Patent and Trademark Office*